United States Patent
Whitney

(10) Patent No.: US 7,237,663 B2
(45) Date of Patent: *Jul. 3, 2007

(54) BI-DIRECTIONAL RELEASE MECHANISM FOR A TORQUE FUSE DEVICE

(75) Inventor: Robert Whitney, New Hartford, NY (US)

(73) Assignee: Riverhawk Company, New Hartford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/464,353

(22) Filed: Aug. 14, 2006

(65) Prior Publication Data

US 2006/0283682 A1 Dec. 21, 2006

Related U.S. Application Data

(63) Continuation of application No. 10/944,638, filed on Sep. 17, 2004, now Pat. No. 7,090,060.

(60) Provisional application No. 60/503,947, filed on Sep. 17, 2003.

(51) Int. Cl.
*F16D 7/02* (2006.01)
*F16D 43/20* (2006.01)

(52) U.S. Cl. ............... 192/56.3; 192/56.5; 192/85 AT; 464/30; 403/31

(58) Field of Classification Search ............ 192/56.3, 192/56.5, 85 AT; 403/5, 15, 31; 464/30, 464/42

See application file for complete search history.

(56) References Cited

U.S. PATENT DOCUMENTS

| | | | |
|---|---|---|---|
| 3,762,183 A | * 10/1973 | Bolliger | 192/150 |
| 4,616,948 A | * 10/1986 | Jelfs | 403/5 |
| 5,051,018 A | * 9/1991 | Appell et al. | 403/5 |
| 5,149,220 A | * 9/1992 | Elsner et al. | 403/5 |
| 5,672,026 A | * 9/1997 | Disborg | 403/369 |
| 6,231,262 B1 | * 5/2001 | Whitney | 403/31 |
| 7,090,060 B1 | * 8/2006 | Whitney | 192/56.3 |

FOREIGN PATENT DOCUMENTS

DE 3643287 A1 * 7/1988
DE 3833350 A1 * 4/1990

* cited by examiner

*Primary Examiner*—Richard M. Lorence
(74) *Attorney, Agent, or Firm*—Jaekle Fleischmann & Mugel, LLP

(57) ABSTRACT

A torque fuse device having a bi-directional release mechanism that releases the torque carrying capability of the shafts upon torque overload is provided. The torque fuse device includes a sleeve, a hub positioned within the sleeve, and a hydraulic torque coupler. The sleeve and the hub are adapted to be coupled with two axially aligned shafts. The hub includes a feedback ring having at least one tooth formed therein. The hydraulic torque coupler includes a piston, a cylinder and a collet. The piston is positioned between the collet and the feedback ring and slides along an inclined surface of collet. One ore more fuse pins are selectively positioned between the tooth, the piston and the cylinder to frictionally engage the sleeve to the hub. Upon a torque overload condition, the pins release from the teeth thereby releasing the torque carrying capability of the shafts.

24 Claims, 5 Drawing Sheets

BI-DIRECTIONAL RELEASE MECHANISM FOR A TORQUE FUSE DEVICE

CROSS-REFERENCE TO RELATED APPLICATIONS

This application claims the benefit of U.S. Provisional Application No. 60/503,947, filed Sep. 17, 2003. This application is also a Continuation of U.S. patent application Ser. No. 10/944,638, which was filed on Sep. 17, 2004, now U.S. Pat. No. 7,090,060 issued on Aug. 15, 2006.

STATEMENT REGARDING FEDERALLY SPONSORED RESEARCH OR DEVELOPMENT

Not applicable.

BACKGROUND OF THE INVENTION

The present invention relates to a torque fuse device for connecting two axially aligned shafts. More particularly, the torque fuse device includes a bi-directional torque release mechanism that releases the torque carrying capability of the shafts when a predetermined release torque is exceeded.

The use of torque release mechanisms to couple two axially aligned shafts is well known and used in a variety of different fields. For example, torque release mechanisms may be used in rolling steel mills and in watercraft drive applications. Specifically, torque overloads or spikes commonly occur when the steel mill rolls become jammed or when a propeller on a vessel strikes an object when traveling through a body of water. In either case, the torque release mechanism operates to release the connection between the two shafts when the aforementioned torque overload events occur to reduce or eliminate damage to the axially aligned shafts.

One type of torque release mechanism that may be used in either of these applications is referred to as a shear pin coupler. In this arrangement, a break pin is fastened between two flanges that extend from opposing axially aligned shafts. The break pin includes a weakened area that is positioned transverse to the longitudinal axis of the pin, which allows the pin to break at a predetermined loading point. Therefore, when a torque overload occurs, the pin breaks and the two shafts are permitted to move relative to each other.

Another known torque release mechanism utilizes friction to couple the shafts to one another. For example, U.S. Pat. No. 5,051,018 provides a coupling for coupling two mutually coaxial rotatable parts. The coupling includes a cylindrical bladder that is adapted to be filled with fluid so that it expands thereby frictionally engaging the two shafts. When the bladder to filled to a desirable level to achieve the necessary friction between the shafts, a plug is used top seal the fluid within the bladder. When a torque overload condition occurs, a blade cuts or otherwise removes the plug to release the hydraulic fluid from the bladder. The friction between the shafts is then reduced allowing the two shafts to move relative to one another.

While each of the torque release mechanisms described above operates to disengage the torque carrying capability between the external shafts, they each suffer from a number of drawbacks and deficiencies. For instance, the use of a break pin or temporary plug will force the user to replace the pin or plug each time the device is reset, which is time consuming and inefficient. In addition, the user must purchase and store replacement parts, which in turn increases the operational cost of the aforementioned devices. Further, the break pin may be subject to various vibratory loads within the connected machinery during operation. This repeated vibratory loading often times causes the break pins to fail prematurely, which results in an unintended shutdown of the equipment.

Some prior art devices will attempt to self-reset with each rotation after a torque overload has occurred. Specifically, the self-resetting devices reset by the rotation of a pair of fuse halves into a particular position where a tooth engages a hole or slot. However, the use of self-resetting devices may also be problematic. Each time the self-resetting device attempts to reset, a vibratory load is imposed on one or more of its components. Thus, if the machinery continues to rotate after a torque release has occurred, the self-resetting device may destroy itself due to is own vibratory loading.

Accordingly, there exists a need for a torque release mechanism that ameliorates the aforementioned drawbacks and deficiencies. The present invention fills these needs as well as other needs.

SUMMARY OF THE INVENTION

In order to overcome the above stated problems and limitations there is provided a torque fuse device that is adapted to couple two external shafts with each other, while providing a bi-directional release mechanism that releases the torque carrying capability of the shafts when a predetermined release torque is exceeded.

In general, the torque fuse device includes a sleeve, a hub positioned within the sleeve and a hydraulic torque coupler. In particular, the sleeve and the hub are adapted to be coupled with the two axially aligned shafts. The hub includes a feedback ring having at least one tooth formed therein. The hydraulic torque coupler includes a piston, a cylinder, a collet and one or more fuse pins. The collet is coupled with the sleeve and has at least one inclined surface. The piston is positioned between the collet and the feedback ring and is adapted to slide along the inclined surface of the collet. The fuse pins are adapted to be selectively positioned between the tooth, the piston and the cylinder to frictionally engage the sleeve with the hub. Each of the fuse pins include a tapered end and a leading edge that is slightly rounded. The piston and cylinder include a pair of opposing conical surfaces that are adapted to receive and come into contact with the tapered end of the pin. When a torque overload condition occurs, the pin releases from the tooth thereby releasing the torque carrying capability of the shafts. It will be understood that the pin is capable of releasing from either side of the tooth when a torque overload condition occurs.

The torque fuse device may also include a retainer ring having a series of apertures defined therein that correspond to the number of pins used in the torque fuse device. Each of the fuse pins are adapted to be positioned within the apertures formed in the retainer ring to maintain the spatial relationship between the pins around the circumference of the device. In addition, the torque fuse device may also include one or more adjustment screws that may be used to adjust how far each of the fuse pins are positioned within the piston and cylinder. Further, a lever arm may extend from each pin to allow a user to move the fuse pins to a set position.

Additional objects, advantages and novel features of the present invention will be set forth in part in the description which follows, and will in part become apparent to those in the practice of the invention, when considered with the attached figures.

BRIEF DESCRIPTION OF THE SEVERAL VIEWS OF THE DRAWINGS

The accompanying drawings form a part of the this specification and are to be read in conjunction therewith, wherein like reference numerals are employed to indicate like parts in the various views, and wherein.

DETAILED DESCRIPTION OF THE INVENTION

Figure 1:
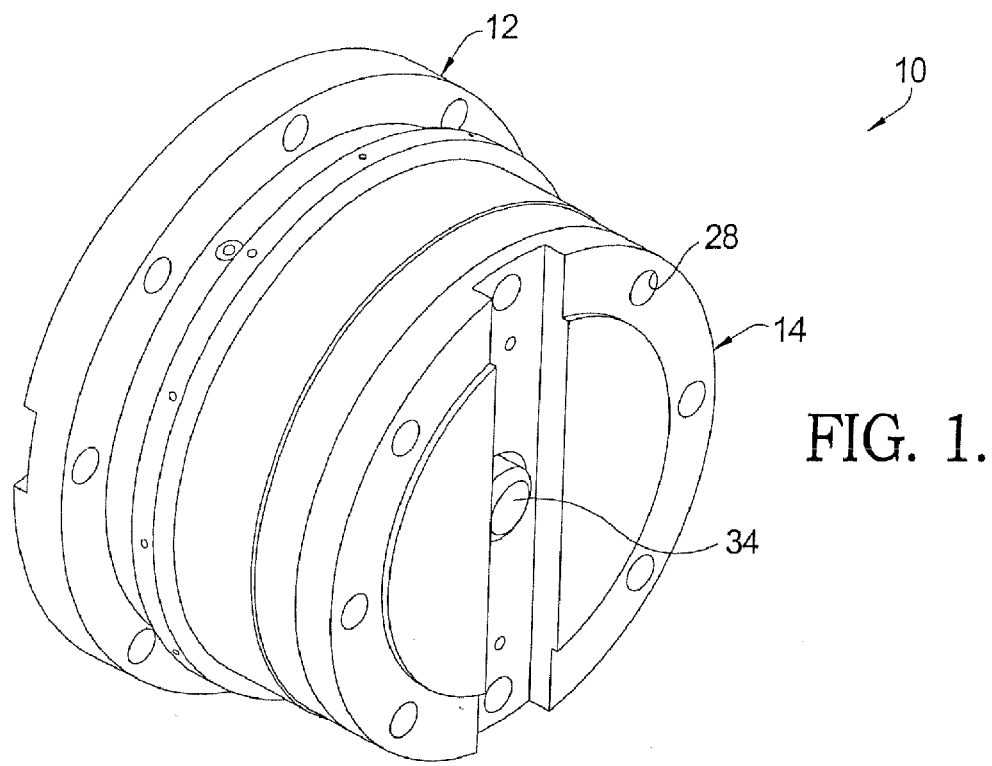
FIG. 1 is a front perspective view of a torque fuse device according to the present invention.
Figure 3:
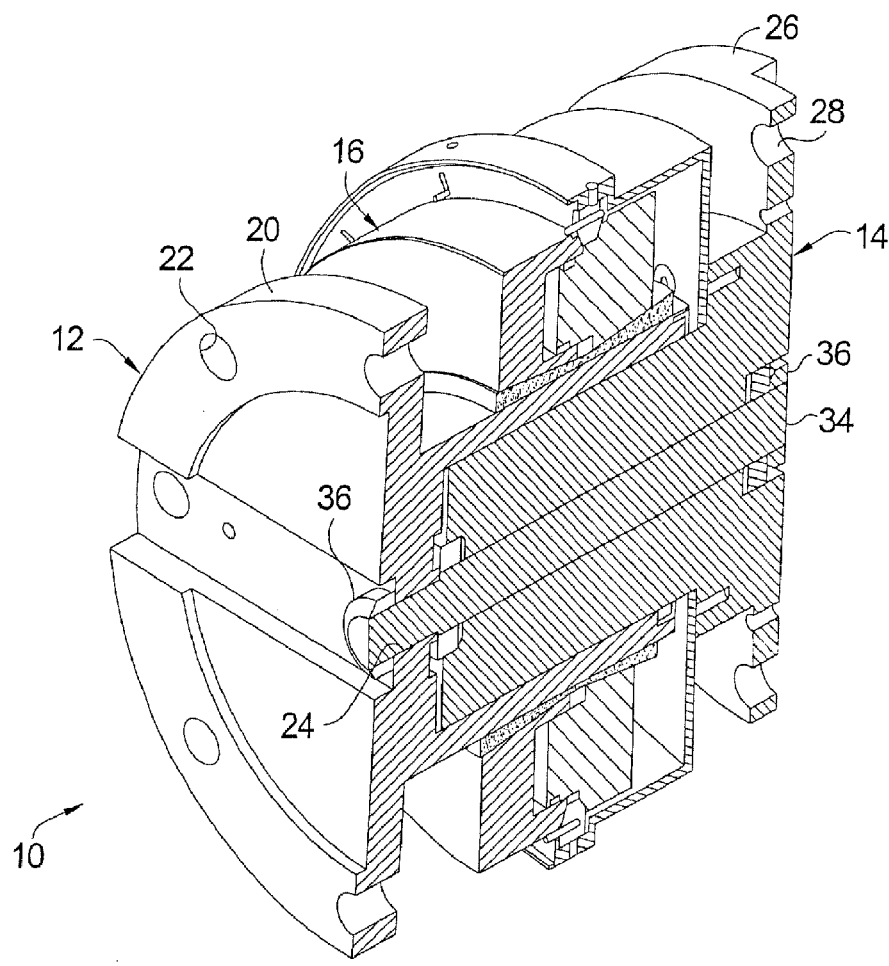
FIG. 3 is a perspective view of a cross-section taken along line 3—3 in FIG. 2.
Figure 4:
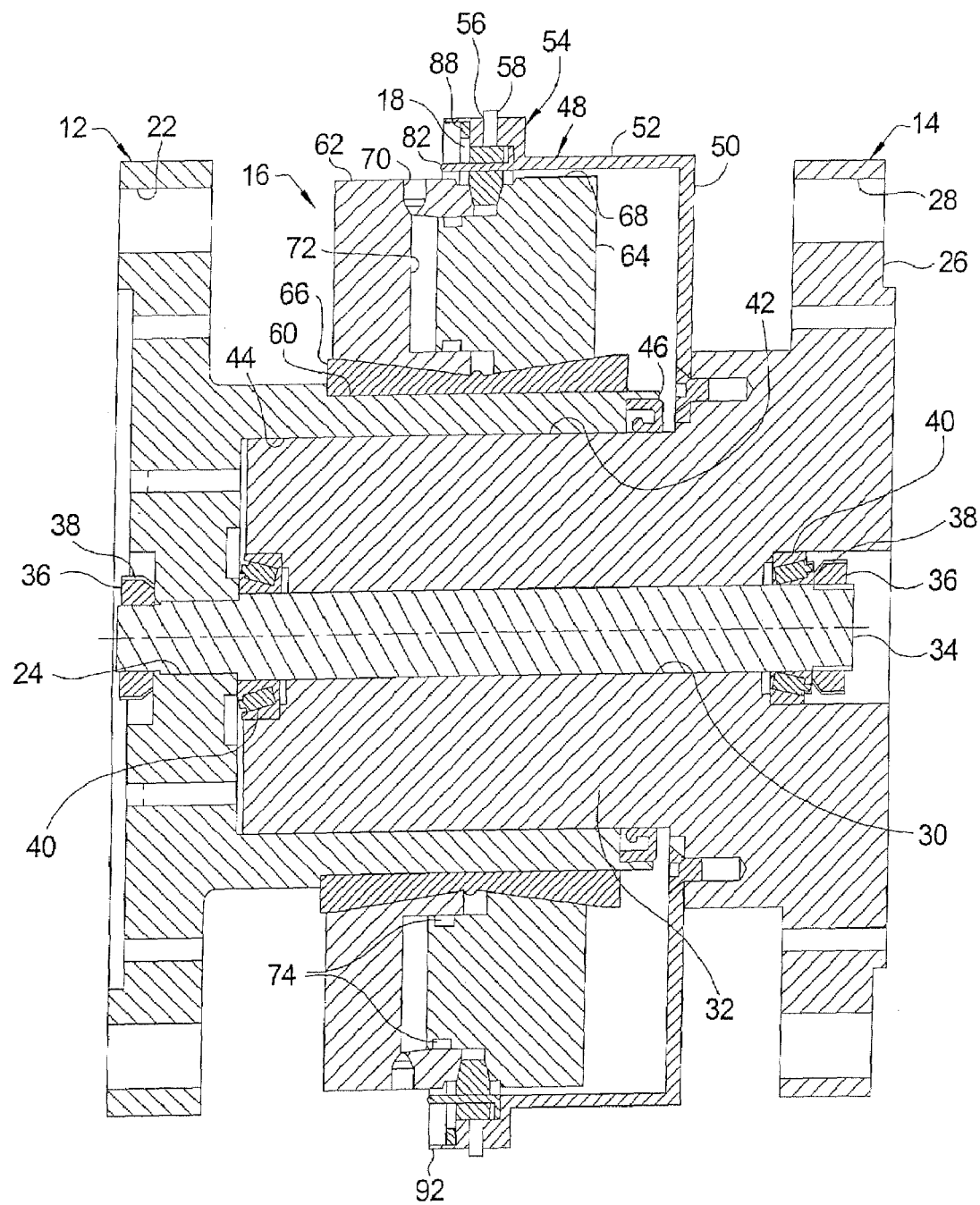
FIG. 4 is an enlarged elevational view of the cross-section shown in FIG. 3.

Referring now to the drawings in detail, and initially to FIGS. 1 and 3, reference numeral 10 generally designates a torque fuse device constructed in accordance with a first embodiment of the present invention. In general, the torque fuse device 10 includes a sleeve 12 and a stub shaft or hub 14. At least a portion of hub 14 is positioned within sleeve 12 and each are adapted to be coupled with a pair of axially aligned shafts (not shown). In accordance with the present invention, as best seen in FIG. 4, torque fuse device 10 also includes a hydraulic torque coupler 16 and one or more fuse pins 18 that operate to frictionally engage sleeve 12 with hub 14. When a toque overload condition occurs, regardless of the direction that the shafts are rotating, torque fuse device 10 releases fuse pin 18, which in turn disengages hub 14 from sleeve 12.

As best seen in FIGS. 3 and 4, sleeve 12 is adapted to be fixedly coupled with a first external shaft (not shown). In particular, sleeve 12 includes an integrally formed circular end piece 20 having a plurality of apertures 22 defined therein to provide a location for the first external shaft to be coupled with sleeve 12 by one or more bolts or another suitable fastening device. In addition, sleeve 12 may be coupled to the first external shaft with a keyed fit joint or a press fit shaft joint. A center aperture 24 is defined in sleeve 12 to provide a location for rotatably coupling sleeve 12 and hub 14 with a shaft 34.

Figure 2:
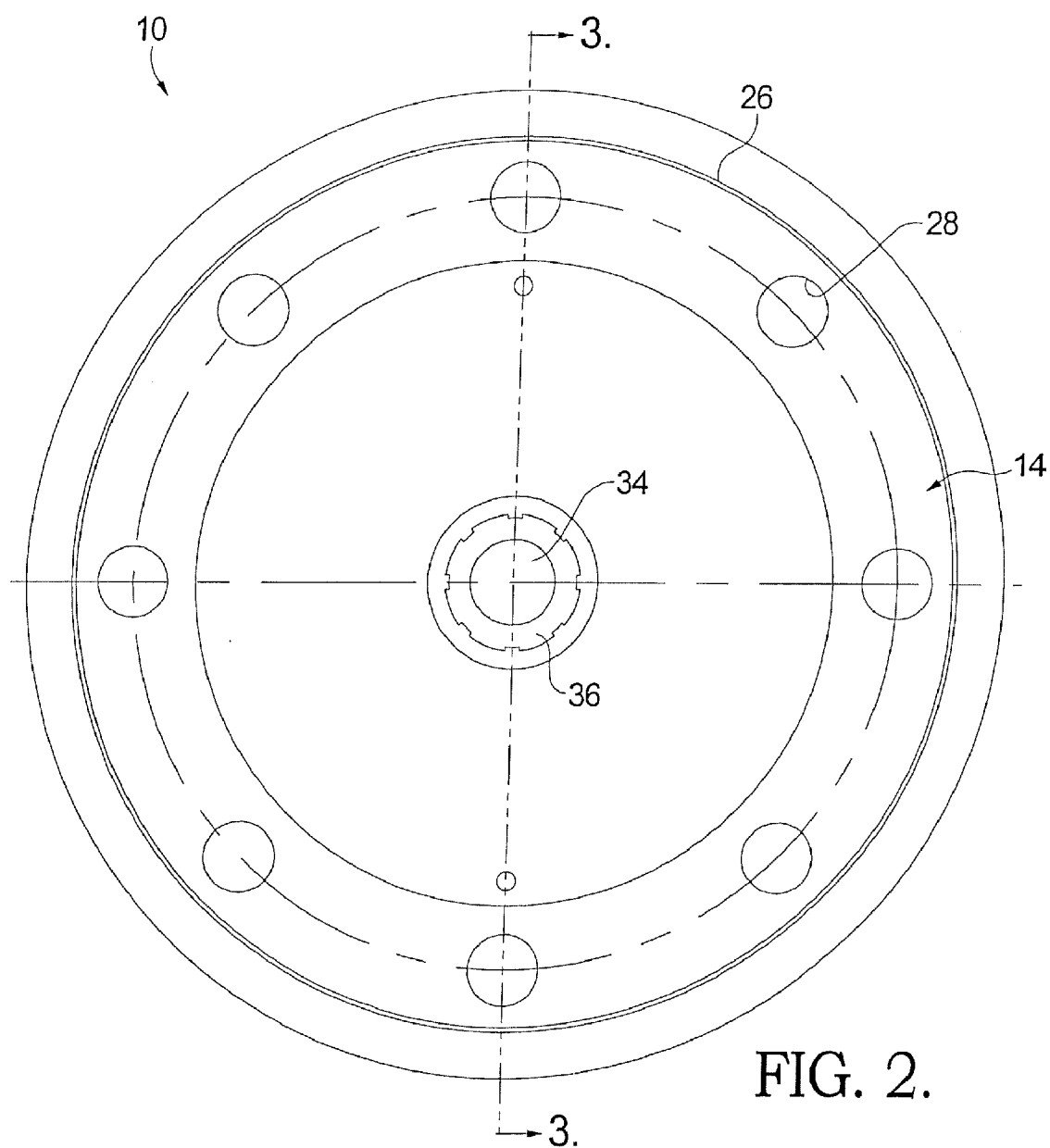
FIG. 2 is an elevational view of a stub shaft or hub of the torque fuse device.

As best seen in FIGS. 2–4, hub 14 is adapted to be fixedly coupled with a second external shaft (not shown) that may be axially aligned with the first external shaft described above. As with sleeve 12, hub 14 includes an integrally formed circular end piece 26 having a plurality of apertures 28 defined therein to provide a location for the second external shaft to be coupled with hub 14 by one or more bolts or another suitable fastening device. In addition, hub 14 may be coupled with the second external shaft with a keyed fit joint or a press fit shaft joint. While the present embodiment describes hub 14 and sleeve 12 as having similar structural features for connecting to the first and second external shafts, it will be understood that the connection features for sleeve 12 and hub 14 may be different due to the type of shafts being connected to torque fuse device 10 or other structural considerations. Further, a center aperture 30 is defined in hub 14 and is adapted to be aligned with center aperture 24 formed in sleeve 12 when a trunk portion 32 of hub 14 is positioned within sleeve 12. In addition, both center apertures 24, 30 are adapted to allow shaft 34 to be positioned therein to rotatably couple sleeve 12 with hub 14. Shaft 34 extends through center apertures 24, 30 and is held into position by a pair of nuts 36 and lock washers 38 fastened to opposite ends of shaft 34. A set of roller bearings 40 are positioned between shaft 34 and hub 14 to allow hub 14 to rotate freely about shaft 34.

When hub 14 is positioned within sleeve 12, it should be understood that there is a close fit between an outer diameter 42 of the hub 12 and an inner diameter 44 of sleeve 12. The close fit allows the sleeve 12 to frictionally engage hub 14 with a relatively small amount of flexure of sleeve 12 toward hub 14. Specifically, the distance between the outer diameter 42 and inner diameter may be between about 0.005 of an inch to about 0.025 of an inch, however, other distances are also contemplated and within the scope of the present invention. Given the close fit between sleeve 12 and hub 14, a lubricant (not shown) may be positioned between the sleeve 12 and hub 14 and contained therein with a shaft seal ring 46.

Figure 6:
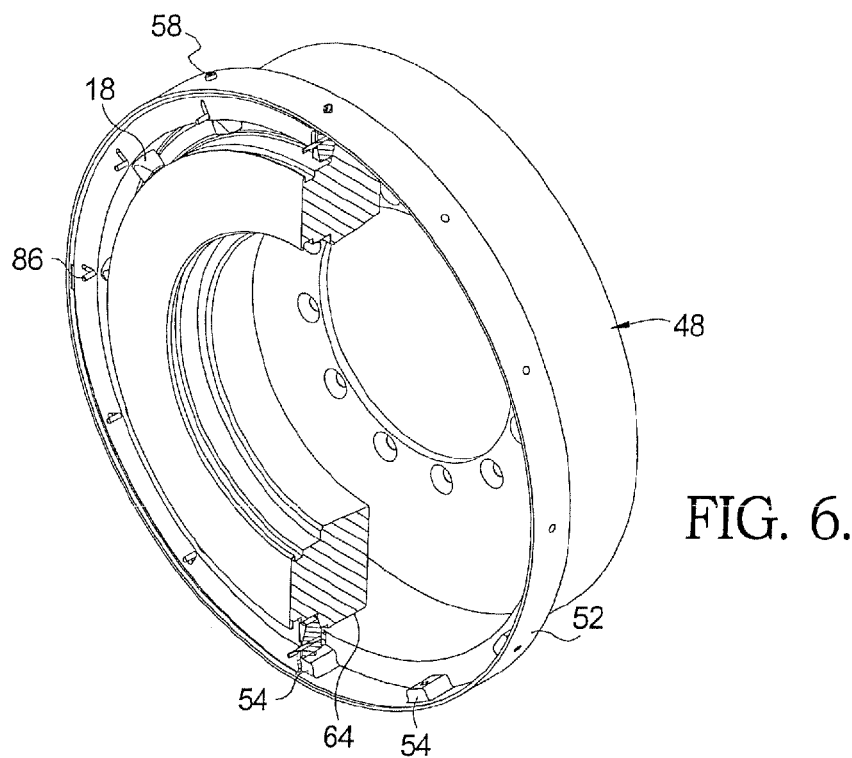
FIG. 6 is a perspective view of the components illustrated in FIG. 5 with portions broken away to show the fuse pins positioned between the piston and feedback ring.

As best seen in FIG. 4, a radial ejector plate or feedback ring 48 is fixedly mounted to hub 14 and includes a side wall 50 and a top wall 52. With additional reference to FIG. 6, top wall 52 has a set of teeth 54 that correspond to the number of fuse pins 18 used in the torque fuse device 10 and which are directed radially inward towards hub 14. In addition, as best seen in FIG. 7, a threaded aperture 56 is formed in each tooth 54 to provide a location for a set of radial adjustment screws 58.

As best seen in FIG. 4, hydraulic torque coupler 16 is positioned around an outer surface 60 of sleeve 12 and is used to apply the force necessary to frictionally engage sleeve 12 with hub 14. In particular, hydraulic torque coupler 16 includes a cylinder 62, a piston 64 and a collet 66. Cylinder 62 is free to move along the taper in collet 66 until interference occurs between sleeve 12 and hub 14. Collet 66 is fixedly mounted to sleeve 12. Piston 64 is positioned between collet 66 and top wall 52 of feedback ring 48 and piston 64 is adapted to slide along the inclined surface of collet 66 to fictionally engage sleeve 12 and hub 14. Cylinder 62 includes a hydraulic input 70 which permits fluid to be inserted into a hydraulic chamber 72 formed between cylinder 62 and piston 64. It will be understood that hydraulic chamber 72 may be sealed with a seal ring 74 to ensure that the hydraulic fluid does not leak between piston 64 and cylinder 62.

Figure 7:
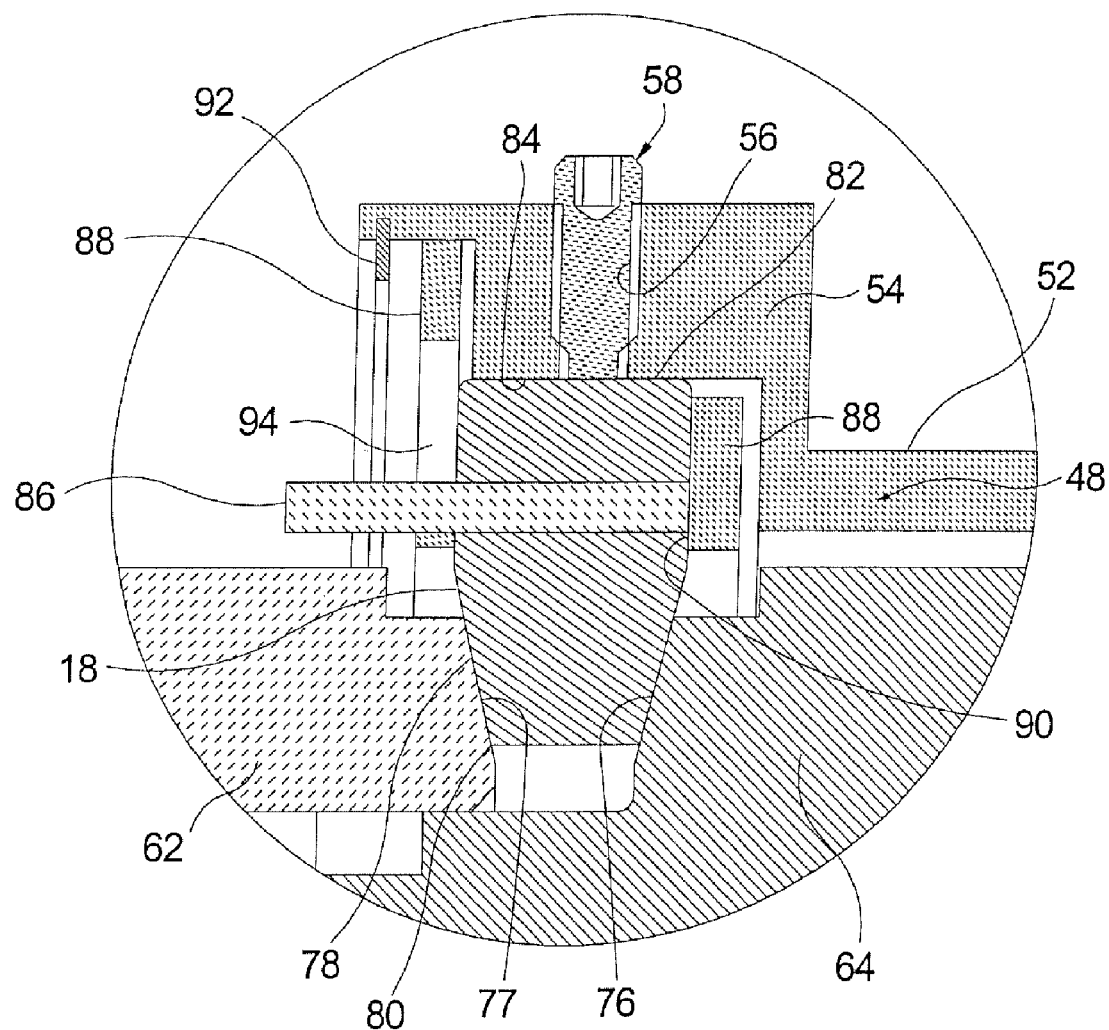
FIG. 7 is an enlarged view of the fuse pin positioned between the piston and cylinder as shown in FIG. 4.

As best seen in FIG. 7, piston 64 and cylinder 62 include opposing conical surfaces 76, 77 that are adapted to receive one or more fuse pins 18. Each fuse pin 18 includes a tapered end 78 so that fuse pin 18 may be received between and placed in contact with surfaces 76, 77. Furthermore, a leading edge 80 of fuse pins 18 may be slightly rounded or curved to reduce the potential wear on fuse pins 18 when released from between cylinder 62 and piston 64. Fuse pin 18 also includes an upper surface 82 that is adapted to contact an inner face 84 of tooth 54 and/or adjustment screw 58. The longitudinal axis of each fuse pin 18 points radially and may be evenly spaced around the circumference of torque fuse device 10. In order to allow a user to manipulate fuse pins 18 during a reset operation, a lever arm or handle 86 may be coupled with one or more of fuse pins 18. While torque fuse device 10 utilizes twelve fuse pins in the present embodiment, it is within the scope of the present invention to use any number of fuse pins with torque fuse device 10. Further, other types of fuse pins in addition to the one shown in the accompanying drawings are within the scope of the present invention so long as they are adapted to release from between the piston and cylinder upon a torque overload condition.

Figure 5:
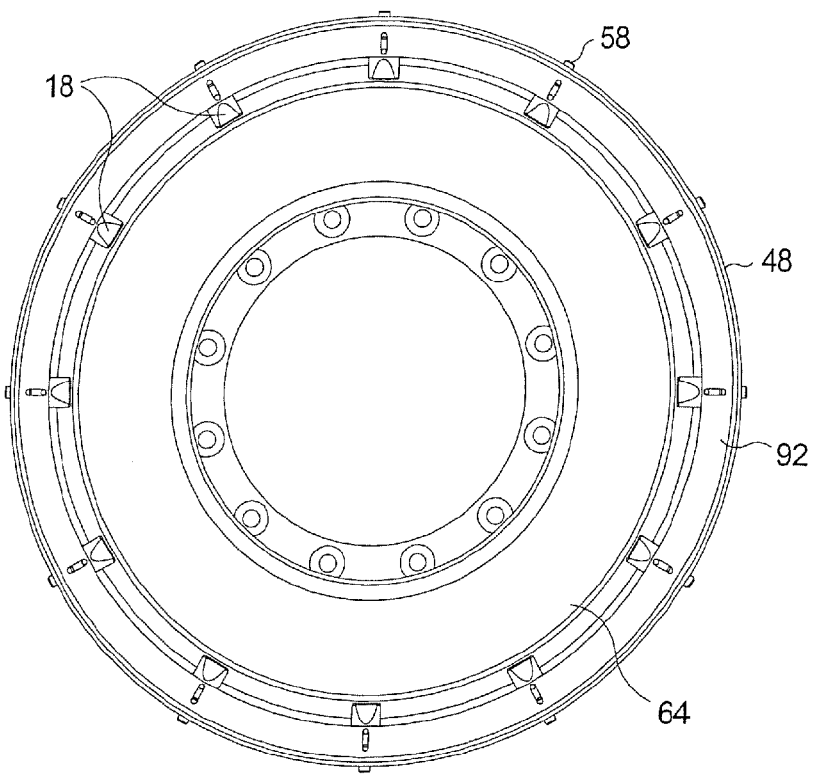
FIG. 5 is an elevational view showing a plurality of fuse pins, a retainer ring, a feedback ring and a piston in accordance with the present invention.

A pin retainer ring 88 is positioned around the outside of the cylinder 62 and piston 64 and fits within feedback ring 48. Retainer ring 88 is not fixedly coupled with either cylinder 62, piston 64 or feedback ring 48, therefore it is free to rotate relative to each of these components. A series of holes 90 are defined in retainer ring 88 that correspond to the number of fuse pins present in device 10. Each of the fuse pins 18 slide into their corresponding holes 90 so that the fuse pins do not fall out of the torque fuse device 10 once they have been released from between cylinder 62 and piston 64. Retainer ring 88 also operates to maintain the circumferential position of fuse pins 18 relative to each other during the reset operation. As best seen in FIGS. 5 and 7, a snap ring 92 is positioned between feedback ring 48 and cylinder 62. Snap ring 92 is radially thin and retainer ring 88 has a slot 94 formed therein to allow lever arm 86 to extend outwardly to a location where a user is able to manipulate fuse pins 18.

In operation, torque fuse device 10 may be placed in a set position to couple the first and second shafts with each other. In particular, as best seen in FIGS. 4 and 7, the set position generally involves positioning each of fuse pins 18 between piston 64 and cylinder 62 to hold piston 64 and cylinder 62 apart and frictionally engage inner diameter 44 of sleeve 12 with outer diameter 42 of hub 14. However, in order to position fuse pin 18 between piston 64 and cylinder 62, a hydraulic fluid is pumped into chamber 72 through hydraulic input 70 to force piston 64 away from cylinder 62. Using lever arm 86, fuse pin 18 may then positioned so that its upper surface 82 rests on the inner face 84 of tooth 54. Since piston 64 and cylinder 62 will have a tendency to push fuse pin 18 radially outward when pin 18 is placed between piston 64 and cylinder 62, tooth 54 will prevent fuse pin 18 from being dislodged from torque fuse device 10. Leading edge 80 of fuse pin 18 is then inserted between piston 64 and cylinder 62 so that conical surfaces 76, 77 are in contact with tapered end 78 of fuse pin 18. While the size of tooth 54 generally determines the distance at which fuse pin 18 will rest within conical surfaces 76, 77, adjustment screw 58 may be used to set fuse pin 18 deeper within piston 64 and cylinder 62 to push piston 64 and cylinder 62 even further apart.

As piston 64 and cylinder 62 are pushed apart by fuse pin 18, piston 64 and cylinder 62 slide upwardly along the incline toward the edges of collet 66. As piston 64 and cylinder 62 move up the collet 66 inclines, a stretching force in piston 64 and cylinder 62 creates radial pressure on collet 66. In reaction to the radial pressure, sleeve 12 flexes toward and clamps onto trunk 32 of hub 14. As sleeve 12 flexes toward hub 14, inner diameter 44 of sleeve 12 will come into contact with outer diameter 42 of hub 14 so that sleeve 12 and hub 14 are frictionally engaged with one another. It will be understood and appreciated that the axial position of piston 64 and cylinder 62 on the incline of collet will determine the degree of frictional engagement between sleeve 12 and hub 14. For instance, the friction created between inner diameter 44 of sleeve 12 and outer diameter 42 of hub 14 will increase as piston 64 and cylinder 62 are positioned further up the inclines of collet 66. Once sleeve 12 and hub 14 are frictionally engaged with each other, torque may then be transferred between the first and second external shafts.

Upon the occurrence of a torque overload or torque spike, torque fuse device 10 operates to disengage the first and second shafts. Specifically, when a torque overload occurs, hub 14 and feedback ring 48 will rotate relative to sleeve 12. The teeth 54 on feedback ring 48 will rotate relative to their corresponding fuse pins 18 so that fuse pins 18 slide out from under the teeth 54. It will be understood that fuse pins 18 may slide out in either direction from their respective teeth 54. As upper surface 82 of each fuse pin 18 is placed out of contact with inner face 84, fuse pins 18 are thrust outwardly by piston 64 and cylinder 62 so that pins 18 are no longer positioned between piston 64 and cylinder 62. This allows piston 64 and cylinder 62 to slide down the incline of collet 66, which allows sleeve 12 to expand or flex outwardly away from outer diameter 42 of hub 14. The frictional engagement is then released and sleeve 12 and hub 14 are free to rotate relative to one another. Thus, torque is no longer transmitted between the first and second external shafts until torque fuse device 10 is reset to the set position discussed above.

The present invention for a torque fuse device provides numerous advantages over the aforementioned prior art devices. For example, the torque fuse device allows for the fuse pins to release independent of the rotation of the external shafts. This is important for machinery used in steel rolling mills that periodically reverse operation and may jam in either direction. Another benefit of the torque fuse device is that it is not fatigued by vibratory loading imposed by the mated machinery. Unlike prior art devices that utilize break pins, plugs or other components to achieve a release condition, the fuse pins in the present invention are not damaged when released from between the piston and cylinder. Therefore, the torque fuse device does not require replacement of sacrificial pins, plugs or other parts that release by breaking. Moreover, the torque fuse device allows the sleeve and hub to rotate freely after the fuse pin is released. This allows for smooth operation of the machinery unlike self-resetting devices that produce a vibratory torque load every time they attempt to reset.

While particular embodiments of the invention have been shown, it will be understood, of course, that the invention is not limited thereto, since modifications may be made by those skilled in the art, particularly in light of the foregoing teachings. Reasonable variation and modification are possible within the scope of the foregoing disclosure of the invention without departing from the spirit of the invention.

What is claimed is:

1. A torque fuse device for releasably coupling a first shaft to a second shaft, the device comprising:
   a sleeve coupled with the first shaft;
   a hub coupled with the second shaft, at least a portion of the hub being positioned within the sleeve;
   a ring coupled with the hub;
   a collet coupled with the sleeve, the collet having an inclined surface;
   a cylinder coupled with the collet; and
   a piston associated with the cylinder and being slidably positioned on the inclined surface of the collet, wherein the piston selectively engages the sleeve to the hub.

2. The torque fuse device of claim 1 wherein the ring has at least one tooth formed therein, the torque fuse device further comprising at least one pin, the at least one pin being selectively positioned between the at least one tooth, the piston and the cylinder to frictionally engage the sleeve to the hub, wherein the at least one pin releases from between the tooth, the piston and the cylinder when a torque overload condition occurs.

3. The torque fuse device in claim 2, wherein the at least one pin includes a tapered end.

4. The torque fuse device in claim 3, wherein the piston and the cylinder each include a conical surface for receiving the tapered end of the at least one pin.

5. The torque fuse device in claim 4, wherein the at least one pin includes a rounded leading edge.

6. The torque fuse device in claim 2, further comprising a retainer ring having an aperture defined therein, wherein the at least one pin is positioned within the aperture.

7. The torque fuse device in claim 2, further comprising an adjustment screw coupled with the ring and positioned to come into contact with the at least one pin.

8. The torque fuse device in claim 2, further comprising a lever arm coupled with the at least one pin.

9. The torque fuse device in claim 2, further comprising a plurality of teeth formed in the ring and a corresponding number of pins.

10. The torque fuse device in claim 1 wherein the cylinder is slidably coupled with the collet.

11. The torque fuse device in claim 1, further comprising a shaft rotatably coupling the sleeve to the hub.

12. The torque fuse device in claim 1, wherein a chamber is defined between the piston and cylinder, wherein a fluid is selectively added and removed from the chamber to move the piston and cylinder relative to one another.

13. A device for releasably coupling a first shaft to a second shaft, the first shaft having a sleeve coupled thereto and the second shaft having a hub coupled thereto, wherein at least a portion of the hub is positioned within the sleeve, and wherein a ring is coupled with the hub, the device comprising:
   a collet coupled with the sleeve, the collet having an inclined surface;
   a cylinder coupled with the collet; and
   a piston associated with the cylinder and being slidably positioned on the inclined surface of the collet, wherein the piston selectively engages the sleeve to the hub.

14. The device of claim 13 wherein the ring has at least one tooth formed therein, the torque fuse device further comprising at least one pin, the at least one pin being selectively positioned between the at least one tooth, the piston and the cylinder to frictionally engage the sleeve to the hub, wherein the at least one pin releases from between the tooth, the piston and the cylinder when a torque overload condition occurs.

15. The device in claim 14, wherein the at least one pin includes a tapered end.

16. The device in claim 15, wherein the piston and the cylinder each include a conical surface for receiving the tapered end of the at least one pin.

17. The device in claim 16, wherein the at least one pin includes a rounded leading edge.

18. The device in claim 14, further comprising a retainer ring having an aperture defined therein, wherein the at least one pin is positioned within the aperture.

19. The device in claim 14, further comprising an adjustment screw coupled with the ring and positioned to come into contact with the at least one pin.

20. The device in claim 14, further comprising a lever arm coupled with the at least one pin.

21. The device in claim 14, further comprising a plurality of teeth formed in the feedback ring and a corresponding number of pins.

22. The device in claim 13, wherein the cylinder is slidably coupled with the collet.

23. The device in claim 13, wherein a chamber is defined between the piston and cylinder, wherein a fluid is selectively added and removed from the chamber to move the piston and cylinder relative to one another.

24. A torque fuse device for releasably coupling a first shaft to a second shaft, the device comprising:
   a sleeve coupled with the first shaft;
   a hub coupled with the second shaft, at least a portion of the hub being positioned within the sleeve;
   a ring coupled with the hub;
   a collet coupled with the sleeve, the collet having a pair of opposing inclined surfaces;
   a cylinder coupled with the collet; and
   a piston associated with the cylinder and being slidably positioned on one of the inclined surfaces of the collet, wherein the piston selectively engages the sleeve to the hub.

* * * * *